INVENTORS
FREDERICK G. SCHUMACHER
AND GEORGE J. IRWIN
BY James H. Ryan
ATTORNEY

United States Patent Office 2,825,629
Patented Mar. 4, 1958

2,825,629

PARTICLE SIZE CONTROL IN THE PRODUCTION OF SODIUM MONOXIDE

Frederick G. Schumacher, Niagara Falls, N. Y., and George J. Irwin, Terre Haute, Ind., assignors to E. I. du Pont de Nemours & Company, Wilmington, Del., a corporation of Delaware Application October 17, 1952, Serial No. 315,226

6 Claims. (Cl. 23—184)

This invention relates to the manufacture of sodium oxides by oxidation of metallic sodium and more particularly to the control of the size of particles formed during the oxidation.

The commercially important oxidizing agent, sodium peroxide, is frequently made by means of a two-step process in which sodium monoxide is first prepared by the burning of metallic sodium in carefully purified air and then further oxidized to the peroxide in oxygen. Equations for the two reactions involved may be written as:

(1) 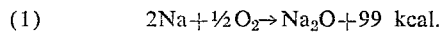
$$2Na + \tfrac{1}{2}O_2 \rightarrow Na_2O + 99 \text{ kcal.}$$

and (2) 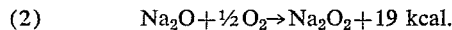
$$Na_2O + \tfrac{1}{2}O_2 \rightarrow Na_2O_2 + 19 \text{ kcal.}$$

The finished peroxide preferred for general industrial use is a yellow powder composed of free-flowing uniform particles devoid of excessively reactive fines. The undesirable nature of this very fine material is shown by the fact that it may spontaneously ignite, at ambient temperatures, such a heavy cloth as the moleskin sometimes employed on filter presses or in chemically protective gloves. Very small particles may also form a dust in air extremely irritating to workmen handling it. In addition, rates of solution in water may become quite low when the solid being dissolved is so finely divided that it may carry a protective layer of air. Particles of an optimum size for commercial operations and avoiding these objections should be retained on screens no finer than about 80 mesh. They should however pass through screens no coarser than 8 mesh to facilitate solution in water. Such material with most of the particles ranging between 8–80 mesh in size is substantially dust-free but sufficiently active for commercial use.

Experience has shown that sodium monoxide particles do not increase appreciably in physical dimensions when oxidized further to the peroxide. If they are too large they may, on the contrary, actually split into many fragments by a process akin to decrepitation and produce the excessively small particles referred to above. To obtain peroxide of the best physical characteristics from sodium monoxide it is therefore necessary that the monoxide itself be a powder of a particle size ranging between 8–80 mesh, that is passing through a screen of 8 mesh/in. but retained on one of 80 mesh/in. A primary object of this invention is development of a process for making sodium monoxide with particles of an average size suitable for further oxidation to commercially acceptable peroxide.

The U. S. Patent 1,685,520 of H. R. Carveth discloses a now well-known method for producing the monoxide. In the method of this patent, sodium is spread over an agitated bed of previously formed pulverulent monoxide and burnt in air to the desired product. Preferably not more than 10% sodium is added at any one time to the bed, the temperature is not permitted to rise above 250° C. and the atmosphere is maintained with a marked oxygen deficiency. Carveth's procedure is used industrially and yields a fairly good product. Unfortunately an undue proportion of fines, i. e. material passing through screens with more than 80 mesh per inch, generally results from strict adherence to the steps outlined. This is particularly true where sodium is added to the bed in the liquid state. A second object of our invention is accordingly improving the process of Carveth.

The excess of fine material formed by Carveth's method has been noted and corrected to some extent, at least, by other investigators. Thus Herzog, U. S. Patent 2,202,252, shows an improved procedure for forming dust-free oxides in which sodium is spread over a diluent bed of sodium monoxide in the form of a plurality of pellets of approximately spherical or globular shape. The other conditions of Herzog are much the same as those of Carveth, temperature for instance being strictly held within the range 180–230° C. Although the alteration in procedure does improve the product, it is not always possible to obtain spherical or globular pellets of sodium monoxide. A third object of our invention is therefore development of a new process for producing dust-free sodium monoxide, and eventually sodium peroxide. Further objects of the invention will be evident hereinafter.

We have found that sodium monoxide of a greatly improved particle size can be formed by continuously spreading liquid sodium over an agitated particulate monoxide bed, burning the sodium substantially as rapidly as it is added to the bed in sufficient air to give a large but carefully controlled excess of oxygen and continuously removing product. The amount of air utilized is between 115% and 135% of that stoichiometrically required by Equation 1 set forth above. The reaction temperature is not especially important and may be allowed to rise to 450° C. or even 500° C. without damaging the product. It is essential however that the monoxide be withdrawn from the reaction vessel at a temperature lower than this reaction temperature and preferably not above 200° C. Intermediate temperatures may exist at points along the diluent bed, held in a generally horizontal position, intermediate the reaction and monoxide withdrawal zones. Details of the invention may be better understood from the remainder of the specification and from the appended drawing in which:

Figure 1:
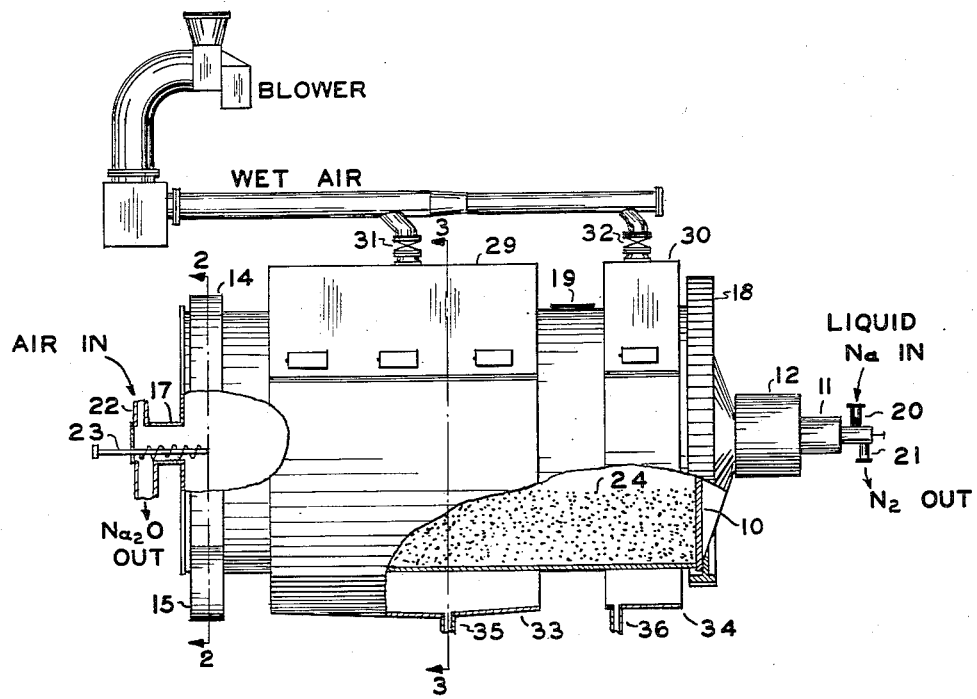
Figure 1 is a view partly in perspective and partly in longitudinal section of a burner convenient for use in carrying out the invention.
Figure 2:
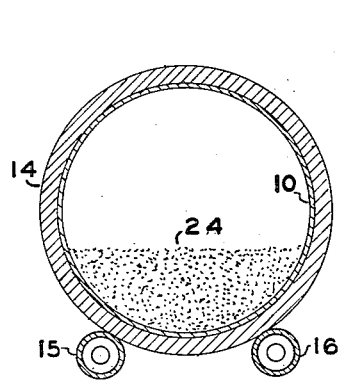
Figure 2 is a cross-section along line 2—2 of Figure 1.
Figure 3:
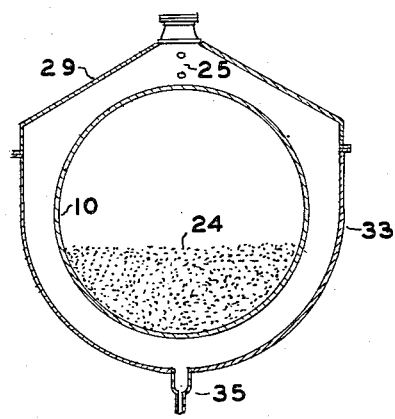
Figure 3 is a cross-section along line 3—3 of Figure 1.

In these figures a horizontal iron or steel retort 10 in the form of a generally closed rotatable cylinder is shown supported by hollow journal 11 passing through bearing 12 and by wheel 14 frictionally contacting rollers 15 and 16. The rollers and the bearing may rest on conventional supports or pedestals (not shown). For convenience in assembly the retort may be made in separate sections which are likewise not shown. Rotation may be imparted to the retort by any convenient means through ring gear 18 affixed externally thereto. A large pipe 17, centered opposite journal 11, and a port 19 provide access to the interior of the retort. Pipes 20 and 21 extend through journal 11, pipe 20 providing an inlet for liquid sodium and pipe 21 serving as an outlet for exhausted air or nitrogen. Pipe 22 extends through large pipe 17 to provide an air inlet. Through pipe 17 also extends conventional screw conveyor 23 which removes sodium monoxide from the reactant bed 24 as it is formed. Coolant water is supplied externally to the retort by sparger 25. Hoods 29 and 30 extend over the retort and conduct away moisture-saturated air through vents 31 and 32. Aprons 33 and 34 collect excess water and discharge it through drains 35 and 36. The hoods and aprons in cooperation effectually enclose the retort and aid in controlling the temperature therein.

The operation of the burner is believed evident from the description. The diluent bed of sodium monoxide is either placed in the retort through the port or remains there from a previous run. If a new run is begun a comparatively small bed, preferably hot, is laid down and covered with brick sodium. Air is passed slowly from one end of the bed to the other and the sodium ignited by means of a hot iron rod pushed in through the port. Rotation is then begun and a flow of liquid sodium started through the sodium inlet. When the depth of the bed reaches about one-third the diameter of the retort, the screw conveyor begins abstracting sodium monoxide and prevents further increase in depth. Temperature is regulated by controlling the water supplied externally. A typical burner may be quite large, taking an initial charge of about 2 or 3 tons of sodium monoxide. The weight of the charge may then build up to a constant value of about 6 tons. The sodium and air flow rates given subsequently are however appropriate for any bed between about 2 and 8 tons. While the apparatus itself forms no part of this invention, temperatures and rates of flow should be regulated as described elsewhere in the specification.

The fundamental basis of this invention is the unexpected discovery that air supplied to the burner in substantial excess over that theoretically required by Equation 1, supra, to oxidize the sodium to the monoxide gives particles of improved particle size. Regulation of the air may be achieved by means of conventional flow meters, not shown in the drawings, preceding air inlet 22. In general the amount of air utilized should be sufficient to furnish 115–135% of the oxygen stoichiometrically required for the oxidation. Previous practice has restricted the air supply to that approximately required by the equation. Excesses up to 10% were sometimes admitted but the general rule opposed any deliberate excess. No significant improvement in particle size was noted as a result of such additions.

The limits set above are fairly critical. Less than 15% of additional air is ineffective in improving particle size. Above 35% excess may cause too rapid combustion and increase peroxide formation. If 33–35% excess is used on monoxide containing a very high percentage of 8–80 mesh particles it actually tends to reduce the size slightly. This excess is however effective in building up the average size of poor quality material. The range 115–125% is most effective and is preferred since it requires less of the dried and filtered air than does the 125–135% range. Since the operation of this process is continuous, the air being admitted at any one time should be 115–135% of that required to oxidize to the monoxide the sodium then being added.

The rate of sodium flow may be varied with the production rate and with the size of the burner available. It may be controlled by conventional pumps not shown in the drawings. For a large burner such as one containing a 6 ton diluent bed, rates of at least 375 lbs./hr. are practicable. Up to 475 or even 500 lbs./hr. can be employed without raising the operating temperature to an undue level. In general sodium feed may be as high as about 3% of the weight of the bed per hour, the lower limit not being critical. Generally the free sodium content of the bed at the feed end should not be above about 0.8%. Monoxide being withdrawn should contain not more than about 0.6–0.7% of Na and about 3.5–4.0% of $Na_2O_2$. Visual observations can aid to some extent in determining the impurities present. Operating normally, the bed should be a gray to dingy white powder at the sodium feed end and light gray to white at the withdrawal end. An excess of sodium or deficiency in oxygen may produce a gray pasty mass and cause breakdown in the particulate nature of the bed.

The actual amount of air required is set by the rate of sodium flow and the 115–135% ratio discussed. Tables can consequently be prepared to guide the burner operators in their work. Thus at a sodium feed rate of 200 lbs./hr. the theoretical requirement for air is about 4000 ft.$^3$/hr. If 15% excess air is to be supplied the requirement is 4600 ft.$^3$/hr. and if 30% excess, 5200 ft.$^3$/hr. These figures vary directly with the sodium feed and hence would be doubled for a 400 lbs./hr. rate and multiplied by 2½ at 500 lbs./hr. By utilization of such compilations labor may be greatly reduced.

In the preferred embodiment of our invention illustrated in the figures counter-current flow of air and liquid sodium is employed. Co-current flow may also be used but improved control of the reaction and higher yields seem to result from the process shown. In either case the highest temperature produced will be found at the end of the burner through which sodium is being pumped since the major portion of the exothermic reaction takes place at that end. The temperature at the sodium inlet end is not critical but should not be allowed to rise much above 500° C. since a higher value here would render the overall temperature of the burner undesirably high. A minimum reaction temperature is about 160–200° C. The water cooling system should be so adjusted that between 160° and 300° C. prevails at the mid-portion of the burner. The temperature of the monoxide as it is removed from the reaction vessel should not be above about 160°–250° C. It is chiefly important in the temperature control that inversions be prevented, that is, the temperature in the center of the reactor must not be above that at the sodium inlet. A pasty mass usually forms in the bed if the inversion occurs. Sodium is introduced preferably in the liquid form while air may be fed at ambient temperatures. Separate thermometers or thermocouples may be installed to measure temperatures at various locations along the bed if it is so desired.

It has been pointed out that the preferred monoxide is one containing particles ranging in size between 8 and 80 mesh. How this invention improves particle size may be illustrated by the screen analyses of Table I.

TABLE I.—SCREEN ANALYSES

| Mesh of Screen | Percentage of Sample Retained on Screen | |
|---|---|---|
| | Sample 1 | Sample 2 |
| 8 | 5 | 5 |
| 20 | 3 | 3 |
| 60 | 20 | 52 |
| 80 | 25 | 21 |
| 100 | 17 | 10 |
| 150 | 15 | 6 |
| >150 | 15 | 3 |

Sample 1 shows an analysis obtainable from a burner operating under conditions utilized before our invention, that is, supplied with approximately stoichiometric quantities of air and held at temperatures of around 250° C. The amount of material falling within the preferred range, 8–80 mesh, is only 48%, 15% being extremely fine flour-like particles that are undesirable. The analysis of Sample 2, typical of a burner operating with from 115–135% of air, shows 76% of preferred monoxide and only 3% of fines. This product is already substantially dust-free but all the fines may be removed by sifting. The two samples shown are artificial but nevertheless representative of the two forms of operation considered. It may also be noted that use of stoichiometric quantities of air only leads to very erratic results, analyses of products changing markedly from day to day. Operation with a large excess of air in accordance with this invention, on the other hand, gives consistent results, it rarely being necessary to alter the air input by as much as 5% within 24 hours' operating time.

How this invention is carried out in practice may be seen from the following illustrative examples:

Example 1

The air rate within one particular burner was changed to 133% of theory and held there for six weeks. The average yield of good quality (8-80 mesh) monoxide obtained during this period was 69%. During the six weeks prior to the change operation with substantially stoichiometric volumes of air was followed. The average yield of good quality product in this earlier period was only 46%. Thus a marked improvement in 8-80 mesh yield was obtained by the methods of this invention.

Example 2

The air rate was raised in another burner to 133% of the theoretical at a time when the diluent bed contained only 26% of good quality material. Operation at this air rate for several weeks gave monoxide averaging 69% of good quality material. This value compares with 38.7% and 51.2% for the average values over the two months preceding the increase in air feed, that is, under operating conditions requiring approximately theoretical quantities of air.

Example 3

The air rate in a burner was raised from about 100% to 125% of the theoretical and held at the higher value for several weeks. Good quality monoxide during this period averaged 73% as compared to 56% and 53% for the two previous months when operation was at about the 100% air level.

Example 4

The burner of Example 1 was carefully checked over a three week period at a high air and sodium input rate. It should be borne in mind that before the air change only 46% of good quality product was obtained from this burner in a four weeks' period and that only approximately theoretical rates of air were supplied thereto. Results of this check are set forth in Table II.

TABLE II

| Day | Sodium Rate, lbs./hr. | Percent Good quality 1 $Na_2O$ at 6 a. m. | Percent <150 mesh | Percent Air | Temperature | | |
|---|---|---|---|---|---|---|---|
| | | | | | $Na_2O$ Discharge | Center | Na Feed |
| 1 | 425 | 72.1 | 2.3 | 119 | 200 | 270 | 450 |
| 2 | 425 | 82.8 | 0.8 | 116 | 190 | 290 | 350 |
| 3 | 425 | 76.6 | 4.9 | 120 | 180 | 240 | 390 |
| 4 | 425 | 79.0 | 5.6 | 127 | 175 | 240 | 380 |
| 5 | 425 | 63.7 | 1.5 | 125 | 190 | 220 | 405 |
| 6 | 425 | 94.7 | 0.3 | 125 | 170 | 240 | 370 |
| 7 | 450 | 81.4 | 3.5 | 123 | 170 | 250 | 390 |
| 8 | 450 | 86.3 | 2.0 | 122 | 190 | 270 | 410 |
| 9 | 450 | 82.9 | | 122 | 190 | 275 | 390 |
| 10 | 450 | 83.0 | 0.2 | 122 | 170 | 240 | 370 |
| 11 | 450 | 68.2 | 1.6 | 122 | 170 | 240 | 380 |
| 12 | 450 | 85.4 | 0.3 | 122 | 170 | 240 | 375 |
| 13 | 450 | 89.0 | 0.2 | 122 | 190 | 240 | 380 |
| 14 | 450 | 88.9 | 1.4 | 119 | 175 | 250 | 365 |
| 15 | 450 | 81.5 | 1.3 | 122 | 200 | 220 | 360 |
| 16 | 475 | 81.6 | 1.8 | 122 | 230 | 225 | 400 |
| 17 | 475 | 81.4 | 4.5 | 122 | 240 | 230 | 390 |
| 18 | 475 | 78.7 | 3.2 | 122 | 210 | 205 | 380 |
| 19 | 475 | 81.9 | 1.4 | 122 | 200 | 190 | 380 |
| 20 | 475 | 81.8 | 2.0 | 122 | 200 | 200 | 390 |
| 21 | 475 | 65.4 | 1.0 | 124 | 210 | 230 | 390 |
| 22 | 475 | 85.5 | 0.2 | 124 | 230 | 230 | 415 |

1 Passing through a screen of 8 mesh/in. but retained on one of 80 mesh/in.

It will be seen that results were very good and much improved over those obtained by operating under the usual conditions, i. e. with approximately stoichiometric quantities of air.

If there is an interruption in operation as by a breakdown or scheduled maintenance, the monoxide obtained may show an undesirable decrease in good quality material in spite of the precautions taken. It then becomes necessary to increase the average particle size. If the bed is yellowish, deficient in sodium, the air supply should be reduced by about 10% of its current value until the gray or dingy white color characteristic of preferred sodium content of the bed, about 0.8%, is restored to the feed end. If the bed is black, rich in sodium, the air should be increased about 10% of its then current values until proper color returns. In either case, when the bed has reached the color described, air should be shut off for ½-2 hours while sodium is fed at the usual rate, that is up to about 500 lbs./hr. for a 6 ton bed. Best results are obtained if air is shut off for about 1 hour. The total sodium addition will thus not exceed about 3 or 4% of the weight of the bed. Air should then be fed at 130% of the theoretical rate to oxidize the sodium, the flow of which is still continuing. This technique may be repeated every 18-24 hours until the proper particle size is obtained. Particles may also grow too large for good operation. If over about 85% of the bed is good quality material, there is usually a breakdown to fines in 24-48 hours. This condition may be corrected by raising the air input to about the upper limit of the 115-135% preferred range. A value of 133-135% will thus slightly lower the percentage of 8-80 mesh monoxide within material containing more than 85% good quality particles in one or two days.

The monoxide produced by the method disclosed above may be readily oxidized by known methods to yield peroxide of good average particle size. If substantially dust-free peroxide is desired, all fines may be removed from the monoxide by sifting through appropriate screens and returned to the reactor bed or utilized for making lower quality peroxide. Coarse material which will not pass through a screen of 8 mesh/in. may be ground up before further reaction. The sized monoxide may then be oxidized in a rotary reactor under oxygen at around 450° C. to form the peroxide. Alternatively, all the monoxide may be oxidized and fines sifted out of the peroxide.

Several variations in the methods of this invention will be apparent to those skilled in the art. Gas mixtures other than air may, for example, be used to effect the oxidation. It is of course essential that no harmful gases be present in such mixtures. The percentage of oxygen may however vary from a low value set by economic considerations up to about 50%. Higher values tend to oxidize material too rapidly. Gas input must be changed in accordance with the oxygen content of the gas utilized. Since still other modifications are within the spirit of the invention, we propose to be bound solely by the appended claims.

We claim:

1. A method for continuously producing particulate sodium monoxide in substantially dust-free form and containing a predominant amount but not more than about 85% of sodium monoxide particles of a size which will pass through an 8 mesh screen and will be retained on an 80 mesh screen, said method comprising continuously agitating a bed of particulate sodium monoxide having the above-stated particle size characteristics at a temperature within the range 160° to 500° C., continuously feeding to said agitated bed liquid sodium and an oxidizing gas containing free oxygen as the only reactive ingredient thereof at a concentration not exceeding 50% by volume, and continuously removing product sodium monoxide containing residual free sodium and having the above-stated particle size characteristics from said bed at a rate corresponding to its rate of production, said sodium being fed at such a rate that the free sodium content of the bed does not exceed 4% by weight, and said oxidizing gas being fed at a rate equivalent to 115 to 135% of the stoichiometric rate, whereby there is continuously produced for a period of at least several weeks sodium monoxide product of consistently uniform particle size characteristics.

2. A method for continuously producing particulate sodium monoxide in substantially dust-free form and containing a predominant amount but not more than about 85% of sodium monoxide particles of a size which will pass through an 8 mesh screen and will be retained on an 80 mesh screen, said method comprising continuously agitating a bed of particulate sodium monoxide having the above-stated particle size characteristics at a temperature within the range 160 to 500° C., continuously feeding to said bed liquid sodium and air, and continuously removing product sodium monoxide containing residual free sodium and having the above-stated particle size characteristics from said bed at a rate corresponding to its rate of production, said sodium being fed at such a rate that the free sodium content of the bed does not exceed about 0.8% by weight, and said air being fed at a rate equal to 115 to 135% of the stoichiometric rate, whereby there is continuously produced for a period of at least several weeks sodium monoxide product of consistently uniform particle size characteristics.

3. A method for continuously producing particulate sodium monoxide in substantially dust-free form and containing a predominant amount but not more than about 85% of sodium monoxide particles of a size which will pass through an 8 mesh screen and will be retained on an 80 mesh screen, said method comprising continuously maintaining a diluent bed of particulate sodium monoxide having the above-stated particle size characteristics in a horizontal rotating furnace which is continuously rotated to agitate said bed, continuously maintaining said bed at a temperature between 160 to 500° C., continuously feeding liquid sodium to said bed from one end of said furnace at a rate such that the free sodium content of said bed does not exceed about 0.8% by weight, continuously feeding air into said furnace at the end thereof opposite that at which the sodium is fed, said air being fed at a rate equal to 115 to 135% of the stoichiometric rate, and continuously removing product sodium monoxide containing residual free sodium and having the above-stated particle size characteristics from said furnace at the end thereof at which air is fed and at a rate corresponding to its rate of production, whereby there is continuously produced for a period of at least several weeks sodium monoxide product of consistently uniform particle size characteristics.

4. The method of claim 3 wherein the bed temperature is highest at the end of the furnace at which sodium is fed, the bed temperature at the center of the furnace is between 160 and 300° C., and the bed temperature at the end of the furnace at which product monoxide is withdrawn is between 160 and 250° C.

5. A method for decreasing the average particle size within a bed of particulate sodium monoxide at a temperature of 160 to 500° C. in a rotating horizontal furnace, said bed containing more than 85% of material which will pass through an 8 mesh screen but will be retained on an 80 mesh screen, said method comprising feeding liquid sodium continuously to said bed at a rate such that the free sodium content of the bed does not exceed 4% by weight, while continuously feeding air into said furnace at a rate equal to 133 to 135% of the stoichiometric rate.

6. In a method according to claim 3, the procedure within a bed of particulate sodium monoxide at a temperature of 160 to 500° C. in a rotating horizontal furnace, said procedure comprising feeding liquid sodium alone to said bed during about one hour to increase the free sodium content of the bed to not more than 4% by weight, and thereafter continuing said feed of sodium while continuously feeding air into the furnace air at a rate equal to 130% of the stoichiometric rate.

References Cited in the file of this patent

UNITED STATES PATENTS

| 1,685,520 | Carveth | Sept. 25, 1928 |
| 1,796,241 | Carveth | Mar. 10, 1931 |
| 2,202,252 | Herzog | May 28, 1940 |
| 2,279,088 | Gilbert | Apr. 7, 1942 |
| 2,685,500 | Hulse et al. | Aug. 3, 1954 |

FOREIGN PATENTS

| 505,734 | Great Britain | May 16, 1939 |

OTHER REFERENCES

J. Chem. Ed., vol. 24, page 320 (1947).

U. S. DEPARTMENT OF COMMERCE
PATENT OFFICE

CERTIFICATE OF CORRECTION

Patent No. 2,825,629            March 4, 1958

Frederick G. Schumacher et al.

It is hereby certified that error appears in the printed specification of the above numbered patent requiring correction and that the said Letters Patent should read as corrected below.

Column 6, line 63, strike out "sodium", second occurrence; column 8, line 20, after "procedure" insert --for increasing the average particle size--.

Signed and sealed this 15th day of April 1958.

(SEAL)
Attest:
KARL H. AXLINE

Attesting Officer

ROBERT C. WATSON
Commissioner of Patents